United States Patent

[11] 3,559,552

| | | |
|---|---|---|
| [72] | Inventor | Meyer Weitzer<br>1616 Jessamine Ave., Orlando, Fla. 32806 |
| [21] | Appl. No. | 805,770 |
| [22] | Filed | Mar. 10, 1969 |
| [45] | Patented | Feb. 2, 1971 |

[54] CAMERA CARRIAGE
6 Claims, 7 Drawing Figs.

[52] U.S. Cl. ..................................................... 95/86,
178/7.1, 352/243
[51] Int. Cl. ..................................................... G03b 17/56
[50] Field of Search........................................ 178/7.2ST;
348/163; 95/86; 310/(Inquired); 352/243

[56] References Cited
UNITED STATES PATENTS
| | | | |
|---|---|---|---|
| 2,661,672 | 12/1953 | Fairbanks..................... | 95/86 |
| 2,719,471 | 10/1955 | Aspden ........................ | 352/243 |
| 2,715,534 | 8/1955 | Hoge............................ | 95/86 |

*Primary Examiner*—Richard Murray
*Assistant Examiner*—Donald E. Stout
*Attorneys*—Joseph C. Warfield, John W. Pease and Harvey A. David

ABSTRACT: A television camera carriage comprising a horizontal platform supported by four dirigible wheels on struts which may be selectively raised to provide a clear view for a camera pivotally supported beneath the platform, counterweight means being operative by movement of the camera to shift the center of gravity of the carriage so as to be stable irrespective of which of several struts is raised.

MEYER WEITZEL
INVENTOR.

BY Harvey A. David
John M. Pearce
Attorneys

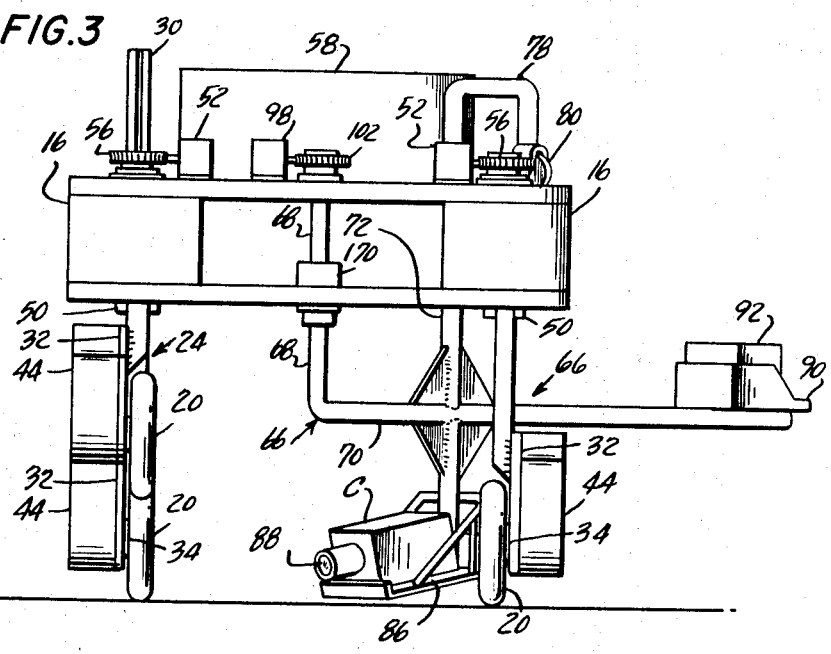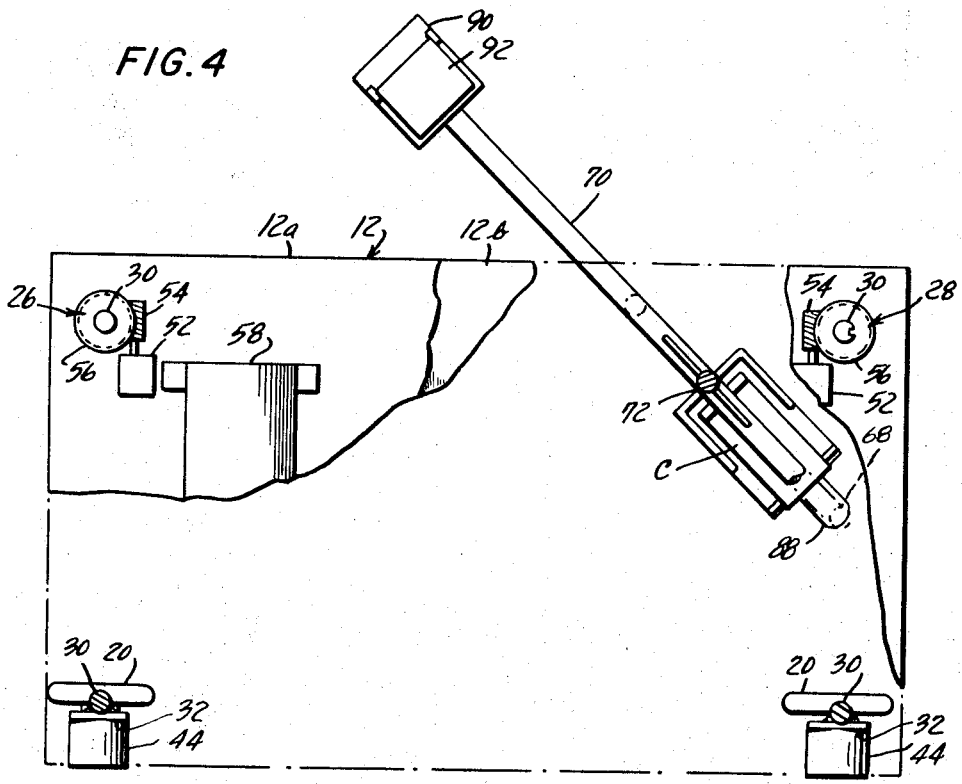

PATENTED FEB 2 1971

MEYER WEITZEL
INVENTOR.

BY Harvey A. David
John W. Pearce
Attorneys

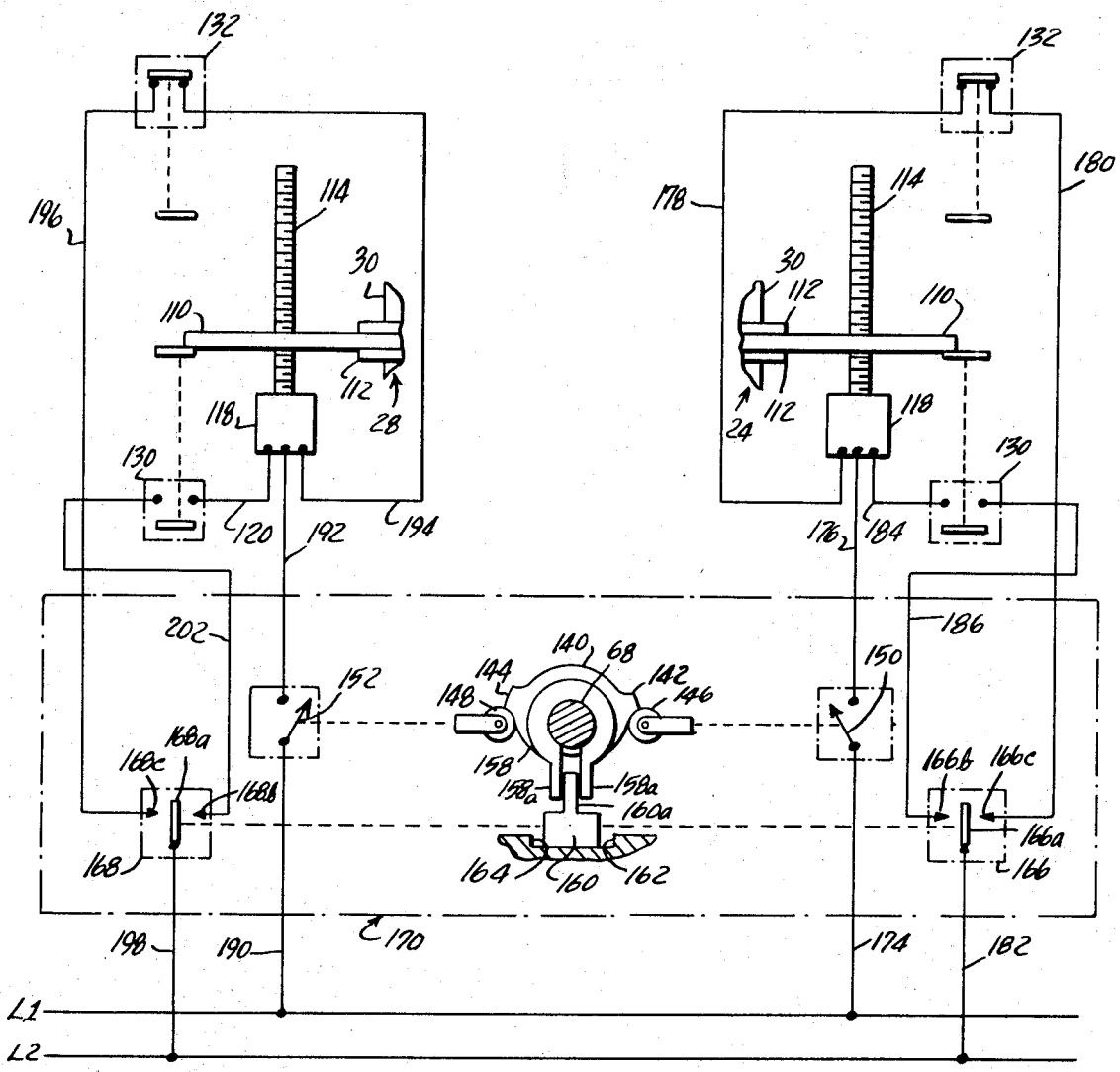

CAMERA CARRIAGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to television camera carriages, and more particularly to that form of wheeled carriage sometimes known as a "crab." Such carriages are used in simulation systems or trainers employing closed circuit television, an example of such a trainer being disclosed in copending patent application Ser. No. 643,306, now U.S. Pat. 3,486,242, filed May 29, 1967, and entitled Assault Boat Coxswain Trainer. Because the camera is required to view a model seascape or landscape from a position close to the floor on which the model is constructed, it has been the practice to construct the carriage with a platform as close to the floor as possible and to mount the camera in cantilever fashion from the top of the platform. This has produced carriages of large size, great weight, and clumsy dimensions. Moreover, the centers of gravity of the camera and the carriage have been far apart in relation to the overall length of the carriage, thereby leading to problems of stability of the camera and carriage.

BRIEF SUMMARY OF THE INVENTION

With the foregoing in mind, it is a primary object of the present invention to provide an improved camera carriage which will enjoy substantially reduced weight, size, and overall dimensions.

It is another important object of the invention to provide a camera carriage wherein the center of gravity of the camera is closer to that of the carriage than has been the practice.

As another object this invention aims to provide an improved camera carriage of the foregoing character through the provision of a platform means supported on four struts having driven, dirigible wheels at the lower ends thereof, a camera support means pivoted beneath the platform means so that the camera normally looks out from between two adjacent struts and wheels, means for elevating one or the other of the adjacent struts and wheels when the camera is turned to look in the direction of one or the other, and counterweight means operative to shift the center of gravity of the carriage when the camera is so turned that the carriage is stable on the remaining wheels in contact with the floor.

BRIEF DESCRIPTION OF THE DRAWINGS

The invention may be further described as residing in certain constructions, combinations, and arrangements of parts by which the foregoing objects and advantages are achieved as well as others which will become apparent from the following description of a preferred embodiment when read in conjunction with the accompanying sheets of drawings forming a part of this specification, and in which:

FIG. 3 is an end view of the carriage with parts moved to different operative positions;

FIG. 4 is a plan view of the carriage with parts in the positions illustrated in FIG. 3, and with portions broken away for clarity;

FIG. 7 is a diagrammatic illustration of a control circuit.

DESCRIPTION OF THE PREFERRED EMBODIMENT

Figure 1:
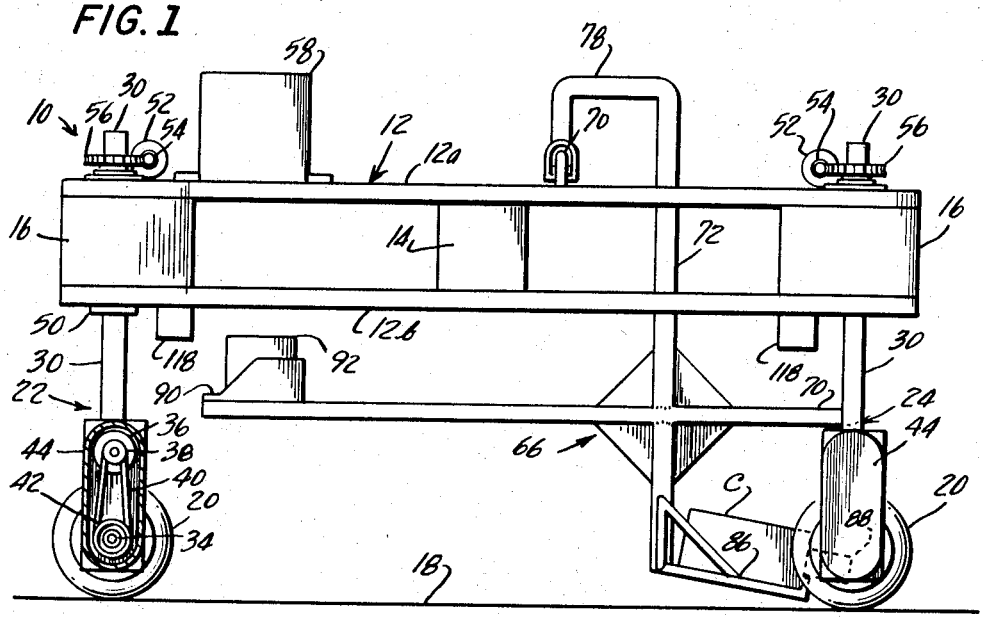
FIG. 1 is a side elevational view of a camera carriage embodying the present invention with portions broken away for clarity.
Figure 2:
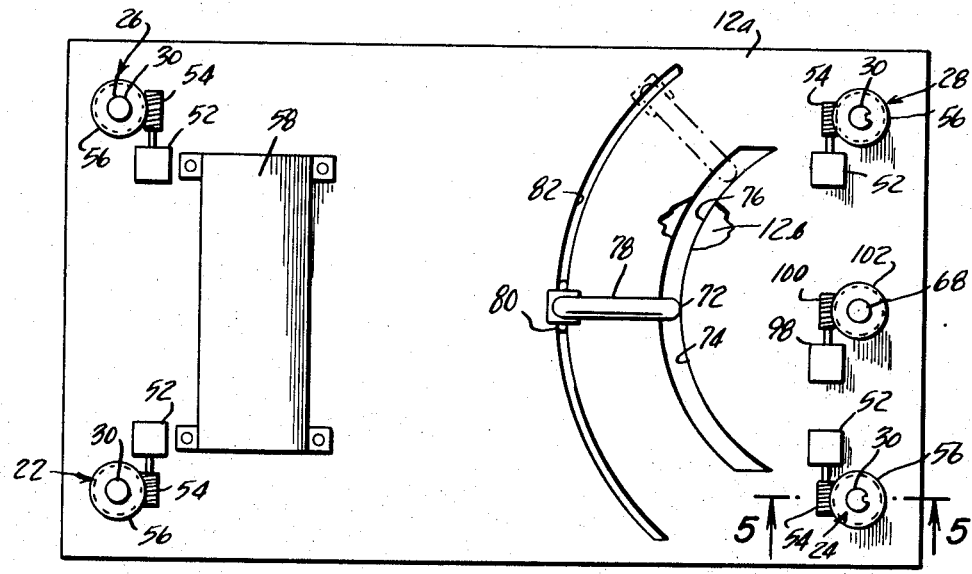
FIG. 2 is a plan view of the camera carriage of FIG. 1.

In the form of the invention illustrated in the drawings and described hereinafter, there is provided a wheeled camera carriage generally indicated at 10 and comprising a platform structure 12 which is rectangular in plan configuration. The platform structure conveniently comprises horizontal upper and lower decks 12a and 12b which are held in spaced parallel relation by suitable connecting members 14 at the sides thereof and 16 at the corners thereof. The connecting means 16 also serve as housings for mechanisms later described in detail.

The platform structure 12 is adapted to be supported and moved over a floor 18 or other plane surface by four dirigible and driven wheels 20, one such wheel being mounted at the lower end of each of four strut means 22, 24, 26, and 28 depending from the corners of the platform structure.

The strut means 22, 24, 26, and 28 each comprise a vertical shaft portion 30 to the lower end of which is fixed, as by welding or the like, a plate 32 in which is suitably journaled the axle shaft 34 of the corresponding wheel 20. The wheel 20 is adapted to be driven by a motor 36 mounted on the plate 32 and having a pulley 38 fixed to the motor shaft. The pulley 38 is connected by a belt 40 to a pulley 42 fixed to the axle shaft 34. The motor 36, pulleys 38, 42, and the belt 40 associated with each wheel 20 are protectively housed in a housing 44. An identical wheel drive arrangement is provided for each wheel 20.

The shaft portion 30 of each of the strut means 22, 24, 26, and 28 is rotatably journaled in the upper and lower decks 12a and 12b of the platform structure to provide for steering of the wheels 20. The shaft portions 30 of the strut means 22 and 26 are provided with suitable thrust bearings 50, while the shaft portions 30 of the struts 24 and 28 are adapted for vertical, axial movement of these shaft portions through the platform structure for the purpose of elevating one or the other of the associated adjacent wheels 20 in a manner which will be made apparent as the description proceeds to clear the field of view of a wide angle television camera C which is supported beneath the platform structure.

Steering of the wheels 20 is accomplished through the agency of four reversible electric motors 52 mounted on the upper platform deck 12a, one at each corner thereof. The motors 52 are connected to the shaft portions 30 of the strut means through worm gears 54 and worm wheels 56, the latter each being keyed to an associated strut means shaft portion. Operation of the steering motors 52 and of the wheel drive motors 36 is under the control of suitable electrical or electronic means housed at 58 on the platform means 12. The control and operation of such steering and drive motors is well understood by those skilled in the art to which the invention pertains and so will not be described in further detail here.

The support of the camera C comprises a pivoted support means, generally indicated at 66, comprising a vertical shaft portion 68 rotatably journaled in the platform structure at one end thereof for rotation about a vertical axis between the adjacent wheels on strut means 24 and 28. A horizontal boom portion 70 extends beneath the platform toward the end thereof supported by strut means 22 and 26. A vertical member 72 has its central portion fixed in crossing relation to the boom 70 and extends upwardly through arcuate slots 74, 76 in the decks 12a, 12b of the platform means, and terminates in an inverted U-shaped portion 78 carrying a roller 80. The roller 80 rides in a suitable groove or track 82 on the upper side of the deck 12a.

The portion of the vertical member 72 extending below the boom 70 has fixed at its lower end a shelf 86 on which the camera C is mounted with the lens means 88 substantially at the axis of rotation of the camera support means 66 and at a predetermined distance and angle with respect to the floor 18. The end of the boom 70 remote from the vertical portion 72 is provided with a shelf or container 90 on which are placed counter weight means 92 which serve not only to balance the weight of the camera 54 about the roller 80 as a center, but also to provide stability to the carriage 10 when one or the other of the strut means 24, 28 is raised to elevate the associated wheel.

Movement of the camera support means 66 and camera C about the axis of shaft portion 68 is accomplished by a reversible motor 98 similar to the steering motors 52. The motor 98 operates a worm gear 100 in mesh with a worm wheel 102 keyed to the shaft portion 68.

Figure 5:
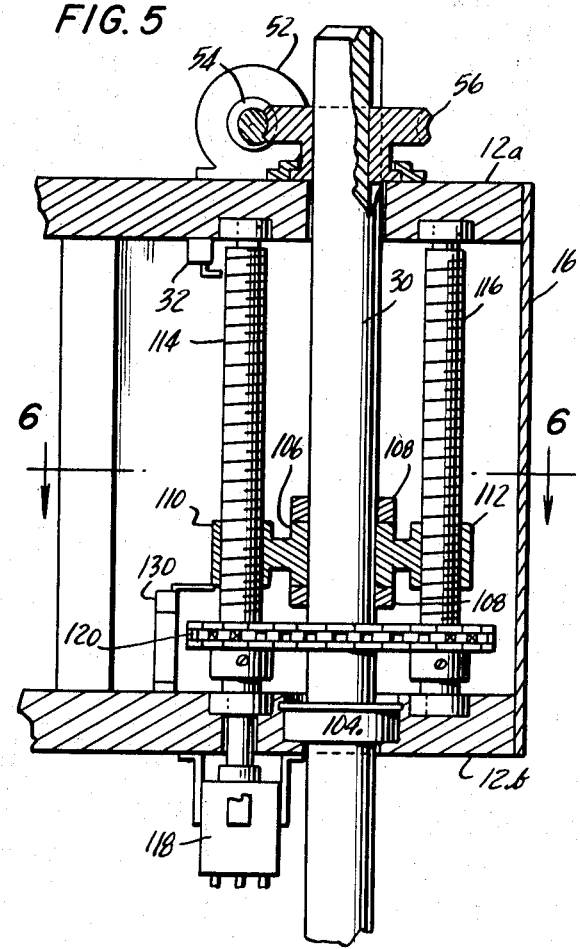
FIG. 5 is an enlarged fragmentary sectional view of a portion of the carriage taken substantially along line 5—5 of FIG. 2.
Figure 6:
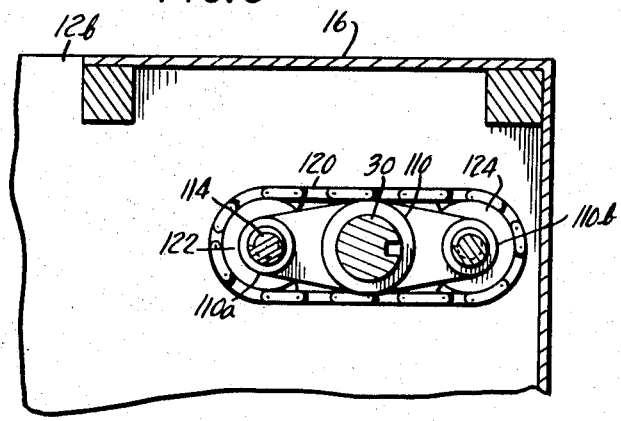
FIG. 6 is a sectional view taken along line 6—6 of FIG. 5.

Referring now to FIGS. 5 and 6, the mechanisms for raising the strut means 24, 28 to elevate the associated wheels 20 will be described. Thus, the shaft portion 30 of the strut means 24 is rotatable and axially slideable in a bearing means 104 in the deck 12b and is slideable in the worm gear 56 to which it is keyed. The shaft 30 is further free to rotate in a thrust member 106 which is disposed between two collars 108 fixed to the shaft. The thrust member has a pair of diametrically disposed nut portions 110 and 112 threadedly engaged on parallel lead screws 114 and 116. The screws 114, 116 have their upper and lower ends journaled in suitable bearing means in the decks 12a and 12b, respectively. The screw 114 is adapted to be directly driven by a reversible electric motor 118 which is mounted on the underside of the deck 12b. The screw 116 is driven from the screw 114 by a chain 120 and sprockets 122, 124. It will be observed that operation of the motor 118 to rotate the screws 114, 116 in one direction will raise the shaft 30 and associated wheel 20, whereas operation of the motor 118 to rotate the screws in the opposite direction will lower the associated wheel. An identical mechanism is provided for the strut means 28 and its wheel.

The lower and upper limits of travel of the strut means are determined by limit switches 130, 132 which are conveniently actuated by the nut portion 110 of the thrust member 106.

Referring now to FIG. 7, there is illustrated a control circuit which is calculated to raise the appropriate strut means and wheel 20 when the camera is moved to look to one side or the other of the straight ahead position from between the adjacent wheels of strut means 24 and 28. The control circuit is arranged, and the speeds of the motors 98 and 118 selected, to raise the appropriate strut means to its fully elevated position within a predetermined amount of movement of the camera to one side or the other of the centered position. This predetermined movement is, for purposes of example, selected as 10°. When the camera turns beyond 10° the wheel remains elevated until such time as the camera returns through the 10° position at which time the wheel begins to lower, reaching contact with the floor 18 prior to the camera reaching its centered position.

Now, with further reference to FIG. 7, wherein the camera is considered to be in its centered position, the shaft portion 68 of the camera support means has fixed thereon a cam 140 having lobes 142 and 144 which cooperate with cam followers 146 and 148 to actuate switches 150 and 152, respectively, when the camera is turned to one side or the other of center.

Additionally, there is disposed about the shaft portion 68, in frictionally gripping relation thereto, a friction member 158 having finger portions 158a disposed on opposite sides of a projection 160a of a slide member 160. The slide member 160 is adapted to be moved by the friction member in one direction or the other between stops 162, 164 when the camera is turned one way or the other. The slide member 160 is connected to operate single pole, double throw switches 166, 168 to control the direction of rotation of the motors 118 when energized. The switch 166 has a contact 166a movable between fixed contacts 166b, 166c. Similarly the switch 168 has a contact 168a movable between fixed contacts 168b, 168c. The cam 140, the friction member 158, and the switches 150, 152, 166, and 168 are all conveniently housed within a protective cover 170 on the deck 12b.

When the camera starts turning toward the strut means 24 (clockwise rotation of shaft portion 68 in FIG. 7), the switch 150 is closed and a circuit may be traced from a power line L1 through a conductor 174, switch 150, conductor 176, the motor 118, a conductor 178, limit switch 132, a conductor 180, now closed contacts 166a, 166b, and a conductor 182 to power line L2. This energizes the appropriate motor 118 in a direction to elevate the strut means 24. During the time required to turn the camera through about 10°, the strut means 24 will be raised to the maximum elevation and limit switch 132 will be opened, breaking the motor circuit. Continued turning of the camera will permit switch 150 to open. Now if the direction of turning of the camera is reversed, the friction member 160 will close contacts 166a, 166c of switch 166 but the motor 118 associated therewith will not be energized until the camera approaches 10° from the centered position. At that time the switch 150 will be reclosed and the motor circuit will be completed through conductors 174, 176, a conductor 186, now closed limit switch 130, a conductor 186, switch 166, and conductor 182 to power line L2. Shortly before the camera reaches its centered position, the limit switch 130 will be opened to break the motor circuit with the wheel 20 in contact with the floor. When the camera arrives at the centered position, the switch 150 will have opened once again.

Throughout the foregoing, the switch 152 has remained open so that although the friction member has operated switch 168, the motor 118 associated with the strut means 28 has remained inoperative.

If the camera is now turned toward the strut means 28, a motor circuit will be established from power line L1 through conductor 190, switch 152, conductor 192, motor 118, conductor 194, switch 132, conductor 196, switch 168, and conductor 198 to power line L2. The strut means 28 will rise until the motor circuit is broken either by limit switch 32 or by reversal of direction of the camera turning before 10° is reached.

Lowering of the strut means will be accomplished in the same manner as described with reference to strut means 24, the motor circuit being completed through conductor 200, limit switch 130, conductor 202, switch 168 and conductor 198.

From the foregoing detailed description it will be appreciated that the previously stated objects and advantages, as well as others apparent herein, have been accomplished by the camera carriage embodying the invention. Of course it will also be appreciated that the described embodiment is provided by way of example and that the invention may be otherwise embodied.

I claim:

1. A wheeled camera carriage comprising:

horizontal platform means;

strut means depending from said platform means;

four dirigible wheels mounted at the lower ends of said strut means and adapted to support said platform means for movement over a plane surface, said wheels defining the corners of a quadrangle;

drive means connected to a plurality of said wheels for effecting said movement;

camera support means pivotally connected to said platform means and operative to support a camera beneath said platform means for rotational movement about a vertical axis extending substantially through the lens system of said camera and between the strut means of two adjacent ones of said wheels;

a boom extending from said camera supporting means for rotational movement therewith;

counter weight means mounted on said boom; and wheel elevating means operative to alternatively raise one or the other of said two adjacent wheels whereby said camera can be rotated through an extended predetermined arc without either of said adjacent wheels being viewed thereby;

said counter weight means being operative to shift the center of gravity of said carriage away from whichever of said adjacent wheels is elevated.

2. A carriage as defined in claim 1, and wherein:

said strut means are four in number, each comprising a vertical shaft portion journaled in a corner portion of said platform means; and steering motor means mounted on said platform means and operatively connected to said shaft portions of said strut means for dirigibly steering said wheels.

3. A carriage as defined in claim 2, and wherein:

the shaft portions of the strut means for said two adjacent wheels between which the camera is located being axially movable to effect said elevation of said adjacent wheels; and said wheel elevating means comprising elevating motor means mounted on said platform means, means connecting said elevating motor means to said strut means for said two adjacent wheels and operative to elevate one or the other thereof in response to predetermined turning movement of said camera by said support means.

4. A carriage as defined in claim 3, and wherein:

said camera support means comprises a boom extending away from said axis toward the end of said carriage remote from said adjacent wheels; and said counter weight means being supported by said boom at an end portion thereof remote from said axis.

5. A carriage as defined in claim 4, and wherein:

said elevating motor means comprises first and second elevating motors, respectively associated with first and second shaft portions of said strut means for said adjacent wheels;

said means connecting said elevating motor means to said strut means comprises first screw means rotatable by said first elevating motor, second screw means rotatable by said second elevating motor, first and second thrust means connected to said first and second shaft portions and having nut portions engaged by said first and second screw means; and control means operative to energize said elevating motors in accordance with turning movement and position of said camera support means.

6. Carriage means as defined in claim 5, and wherein:

said control means comprises cam means and cam operated switch means operable upon predetermined movements of said camera support means through predetermined angular positions;

a friction member mounted for limited movements responsive to direction of movement of said camera support means; and additional switch means actuable by said friction member upon said limited movements.